(12) United States Patent
Mori et al.

(10) Patent No.: US 6,502,942 B2
(45) Date of Patent: Jan. 7, 2003

(54) REAR PROJECTION DISPLAY APPARATUS AND TRANSLUCENT SCREEN FOR USE THEREIN

(75) Inventors: Shigeru Mori, Chigasaki (JP); Yoji Nakayama, Yokohama (JP); Shigeru Inaoka, Yokohama (JP); Kazunari Nakagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/967,771

(22) Filed: Sep. 28, 2001

(65) Prior Publication Data

US 2002/0109915 A1 Aug. 15, 2002

(30) Foreign Application Priority Data

Sep. 29, 2000 (JP) ........................................ 2000-302829
Sep. 5, 2001 (JP) ........................................ 2001-268193

(51) Int. Cl.⁷ ............................ G03B 21/14; G03B 21/60
(52) U.S. Cl. ............................ 353/74; 353/69; 359/453; 359/456
(58) Field of Search ................................ 353/74, 75, 69, 353/77, 78; 359/452, 453, 454, 455, 457, 460

(56) References Cited

U.S. PATENT DOCUMENTS 6,147,801 A * 11/2000 Goldenberg et al. ........ 359/456
6,256,145 B1 * 7/2001 Kono et al. ................. 359/457
6,271,965 B1 * 8/2001 Miyata ........................ 359/453

FOREIGN PATENT DOCUMENTS

JP 11-24169 A 1/1999

* cited by examiner

Primary Examiner—William Dowling
(74) Attorney, Agent, or Firm—Townsend and Townsend and Crew LLP (57) ABSTRACT

For providing a rear-projection type display apparatus, and a translucent type sheet for use therein, in particular, using an image modulation element, such as, a liquid crystal or a DMD (Digital Micro-mirror Device), etc., dissolving the speckle disturbances, thereby obtaining a picture being high in brightness and superior in resolution (focus property) thereof, wherein the translucent type screen comprises, a Fresnel sheet (6), at least on a light exit surface of which is formed a Fresnel lens (8), and a lenticular sheet (7), at least on a light incident surface of which is formed a lenticular lens (10) for diverging the light in horizontal direction, and the Fresnel sheet contains light diffusion material (9-1) while the lenticular sheet contains diffusion material (9-2), and being constructed so as to satisfy the condition as described below:

$$15 \leq Hf \cdot HL \leq 45$$

$$Hf < HL$$

where, $Hf$ (%) indicates a haze value indicative of content of the diffusion material in the Fresnel sheet, and $HL$ (%) a haze value indicative of content of the diffusion material in the lenticular sheet.

13 Claims, 4 Drawing Sheets

REAR PROJECTION DISPLAY APPARATUS AND TRANSLUCENT SCREEN FOR USE THEREIN

BACKGROUND OF THE INVENTION

The present invention relates to a display apparatus of rear projection type (hereinafter, a rear projection display), for displaying a picture with using an image or video modulation element having pixels in the structure thereof, such as of a translucency/reflection type liquid crystal panel and/or a DMD (Digital Micro-mirror Device), as well as, a translucent type screen for use therein. In particular, it relates to a projected light therein, and to the rear-projection display apparatus and the translucent screen, in which improvements are made for reducing speckle disturbances or obstructions caused by the interferences between a diffusion element or the like, such as, diffusion materials which are contained in the translucent screen thereof.

In the conventional rear-projection display apparatus, original pictures displayed on CRTs of red, green and blue colors, each having an effective screen size of about from 5 inches to 7 inches, are enlarged to be projected upon the translucent screen, with using a projection lens of a large aperture (i.e., having a large visual angle from the screen side), the F-number of which is about 1, for example. Thus, the F-number is a numeral value indicative of brightness of the lens, and it is equal to the ratio, f/D between the focal distance "f" and the aperture "D" of the lens. The smaller the F-number, the larger the brightness of that lens. Further, the translucent screen comprises a Fresnel sheet and a lenticular sheet. On the Fresnel sheet, the Fresnel lens is formed at least upon the light exit surface thereof. On the lenticular sheet, the lenticular lenses are formed upon both surfaces thereof (i.e., the light incident surface and the light exit surface), while dispersing light diffusion material within an inside of that sheet at a certain amount thereof.

In recent years, a new product of such the rear-projection display apparatus comes up on a market, with using an image modulation element therein, which includes a reflective/translucent liquid crystal panel and plural numbers of fine mirrors, for example, in place of the CRTs. The image modulation element modulates the light emitted from a light source responding to an input video signal by a unit of the pixel, thereby to form the light of original picture. In this rear-projection display apparatus having the image modulation element, there is used or adopted a projection lens of relatively small pupil diameter (or having a small visual angle from the screen side), the F-number of which is about 2. Thus, the F-number is a numeral value indicative of brightness of the lens, and is equal to the ratio, f/D between the focal distance "f" and the aperture "D" of the lens. And, the smaller the F-number, the larger the brightness of that lens.

In a case where the visual angle of the projection lens is small, random diffuser elements, such as the diffusion materials contained within the translucent screen, interfere with the light, thereby causing the so-called speckle disturbances. The speckle disturbances is a phenomenon which can be seen often in a case where a laser light of narrow spectrum is irradiated upon the diffusion surface (for example, a frosted or obscured glass), wherein numbers of twinkling bright points are generated within a certain range in the picture irradiated, as a typical example thereof.

Figure 1:
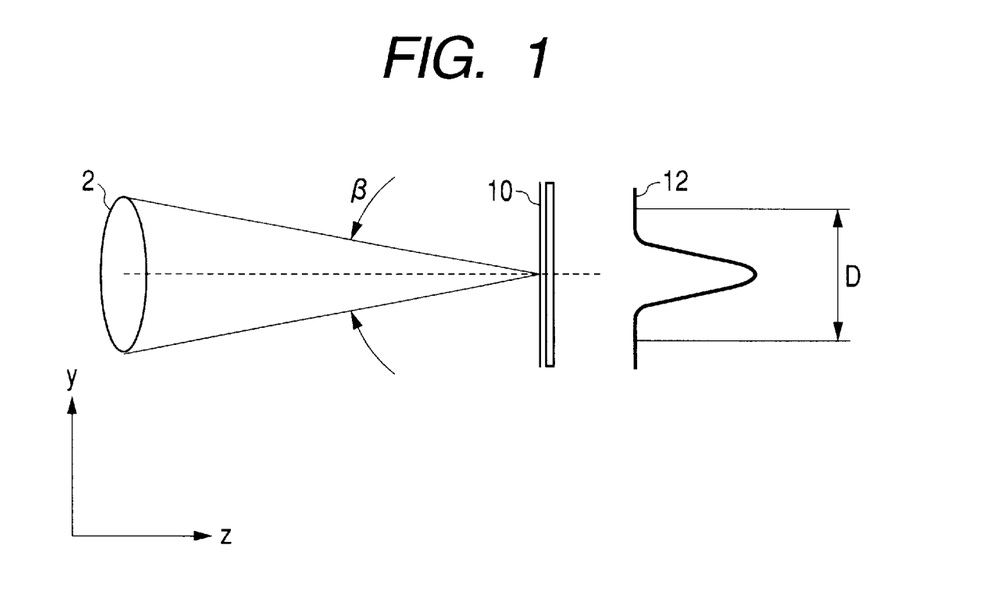
FIG. 1 is a view for explaining generation of the speckle disturbances.

First, explanation will be given on a principle of generating the speckle disturbances, by referring to FIG. 1. In this FIG. 1, the projection lens 2 is that having a plural number of lens elements, for example, and it is replaced by one of the lens element for the purpose of simplification in the explanation thereof in that figure. The light exiting from the projection lens 2 is incident upon a diffusion layer 10 laminated on the translucent screen by a visual angle β (i.e., the visual angle from the screen side onto the pupil of the lens). In this instance, if the visual angle β is small, between the light ray and the random diffuser element, such as the diffusing materials, etc., which are contained within the diffusion layer 10, the mutual interferences (i.e., the speckle disturbances) occur within a certain interference extent or range D, as is shown by a waveform 12. Further, with the axes shown on the right-hand side of the waveform 12, the "y" axis indicates the extent or range, while the "z" axis the strength or intensity thereof. Therefore, the extent or range is widen where the speckle disturbances occur if the "y" axis of the pulse-like portion is large on the waveform 12, while the intensity thereof is enhanced or increased when the "z" axis portion is large.

In the article of SPIE society, February of 1997, regarding the range of the interferences (hereinafter, interference range) mentioned above, the followings are described. (1) The visual angle β[rad] is an angle of β=1/[F×M], if assuming that the F-number of the projection lens 2 is "F", and that the projection magnification of the projection lens 2 is "M", and then the interference range "D" is in the relationship of inverse proportion to β, i.e., D α1/β. (2) The interference range "D" can be established by the relationship of the following equation between the F-number "F" and the magnification "M" of the projection lens, assuming that the diffusion layer is a first layer of particles and the wavelength is "λ" of the light being incident upon the screen.

$$D \approx \lambda \times F \times M \tag{Eq. 1}$$

By the way, in a case when the interference range D is fully or sufficiently larger than the particle diameter of the diffusion materials, such as the random diffuser elements, the speckle disturbances can easily occur, on the contrary to this, it hardly occurs when the interference range "D" is fully smaller than the particle diameter of the diffusion materials. In the case of the apparatus using the CRTs therein, since the practical values of the wavelength "λ", the F-number, and the projection magnification "M" are about λ=0.50 μm, F=1.0, and M=11 (in the case of the display size of the CRT being 5 inches, and of the screen size being 55 inches in the opposite angle), respectively, therefore the interference range D comes to be D≈6 μm. This value is smaller than the particle diameter (i.e., several tens μm) of the diffusion materials, which are used actually. Accordingly, in the case of the apparatus of using the CRTs therein, it is difficult that the speckle disturbances occur.

On a while, with the apparatus of using the image modulation element therein, since the practical values of the "λ", the F-number and the projection magnification "M" are about λ=0.50 μm, F=2.5, and M=70 (in the case of the display size of the image modulation element being about 0.8 inch, and the screen size being 55 inches in the opposite angle), respectively, therefore the interference range "D" comes to be D=90 μm. This value is larger than the particle diameter (i.e., several tens μm) of the diffusion materials, which are used actually. Accordingly, in the case of the apparatus of using the image modulation element therein, the speckle disturbances can easily occur because the visual angle β (=1/F·M) of the projection lens is small.

The conventional technology, for the purpose of reducing the speckle disturbances in the case of using the projection lens of a small visual angle β, is described or known by, for example, Japanese Patent Laying-Open No. Hei 11-024169 (1999). In this conventional art, it is disclosed that the Fresnel sheet has the function of a spatial filter, for averaging the images over the area being larger than the interference range "D", in the case where the diffusion layer is formed on the lenticular sheet of the translucent screen.

SUMMARY OF THE INVENTION

However, for the purpose of enlarging an angle of field or visibility in the vertical and/or horizontal direction(s), the light diffusion materials are mixed, not only into the lenticular sheet, but also into the Fresnel sheet. In the conventional art mentioned above, no consideration is taken into the consideration, upon the reduction of the speckle disturbances in the case of mixing the light diffusion element or agent into an inside of the Fresnel sheet. Nor no such the technology/idea is proposed, for reducing the speckle disturbances while suppressing the deterioration on picture quality (in particular, on the focus characteristic or property) in such the cases.

Accordingly, the present invention has an object, in the rear-projection display apparatus of using the image modulation element therein, preferably, to reduce the speckle disturbances in the case where the light diffusion materials are mixed into both the lenticular sheet and the Fresnel sheet, while suppressing the deterioration on the picture quality thereof.

For achieving the object mentioned above, in accordance with the present invention, the Fresnel sheet and the lenticular sheet are constructed, so that they satisfy the following conditions, in particular, in the case where the light diffusion materials are mixed into them, respectively:

$$15 \leq Hf \cdot HL \leq 45$$

$$Hf \leq HL$$

Where, Hf (%) is a haze value indicative of content of the diffusion material mixed into the Fresnel sheet mentioned above, while HL (%) the haze value indicative of content of the diffusion material into the lenticular sheet mentioned above.

Namely, in accordance with the present invention, the contents of the light diffusion materials, being mixed in the lenticular sheet and the Fresnel sheet, are set to the values mentioned above, respectively, thereby to satisfy the following condition for reducing the speckle disturbances:

$$t0 \cdot \theta v > D$$

Where, "t0" indicates the distance from the light incident surface of the Fresnel sheet mentioned above, up to the focus of the lenticular lens formed on the lenticular sheet mentioned above, "θv" a composed value between light emission angles, including "θvf" of the Fresnel sheet mentioned above and "θvH" of the lenticular sheet mentioned above, and "D" the interference range defined between the light diffusion member and the light, being obtained by the product among the F-number "F", the magnification "M" of the projection lens mentioned above, and the wavelength "λ" of the light, which is incident upon the translucent screen mentioned above.

With such the structure mentioned above, in accordance with the present invention, it is possible to reduce the speckle disturbances of causing the deterioration on the picture quality, while maintaining high rightness and high focuses the display apparatus.

DETAILED DESCRIPTION OF THE PREFERRED EMBODIMENTS

Figure 2:
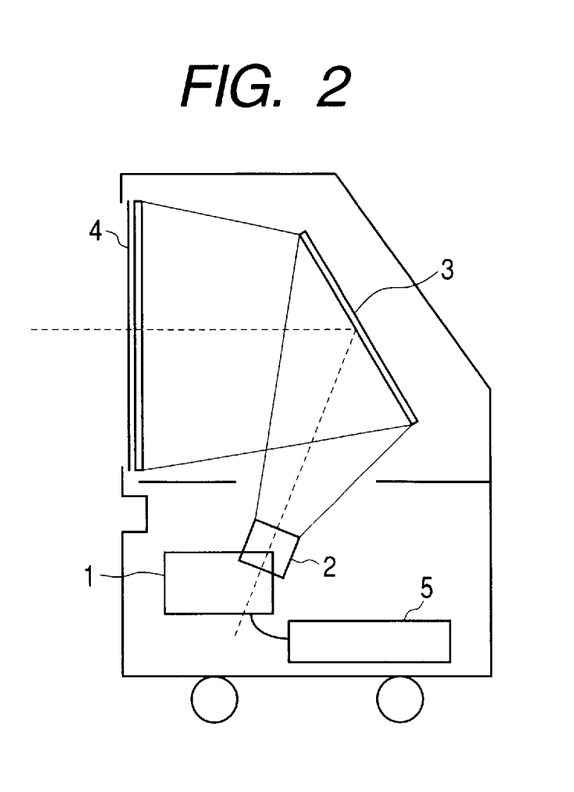
FIG. 2 is a main cross-section view of a rear-projection display apparatus, into which the present invention is applied.

Hereinafter, embodiments according to the present invention will be fully explained by referring to the attached drawings. FIG. 2 is a view for showing the main cross-section view in the vertical direction of a rear-projection display apparatus, into which the present invention is applied for. A display means 1 includes a light source for emitting or irradiating a white light therefrom, though not shown in the figure, and an image modulation element of, such as, a reflection-type/translucent-type liquid crystal panel, or the so-called DMD (Digital Micro-mirror Device), etc. The light from the light source is incident upon the surface of the image modulation element. This image modulation element inputs a video input, which is outputted from a circuit block 5 for processing the video signal and so on, and it modulates the incident light by a unit of a pixel upon the basis of the video signal inputted. Also, this image modulation element modulates the image or picture through controlling the reflection angle of the incident light by the unit of the pixel depending upon the video signal inputted, by means of micro-mirrors disposed for each of the pixels, in particular, in the case of the DMD, for example. However, the details of the structure and/or the operation of this image modulation will be omitted herein, since they are not the gist of the present invention. The image light being modulated by means of the image modulation element is then incident upon the surface of a projection lens 2, having a plural number of lens elements therein, actually. This projection lens 2 enlarges the image light from the image modulation element to be projected upon, and then the projection light is reflected upon a reflection mirror 3, so as to be projected upon a rear surface of a translucent screen 4. With this, the image is displayed on the front surface (i.e., a viewer's side of the image) of the translucent screen 4. The image display means mentioned above has the structure of rectangular pixels, each being 0.8 inch in the opposite angle and having a side length of 14 μm, for example, while the projection lens 2 being about 2.5 in the F-number and about 70 times in the projection magnification "M" thereof, and a high-pressure mercury lamp of short arc is applied as the light source lamp thereof.

Figure 3:
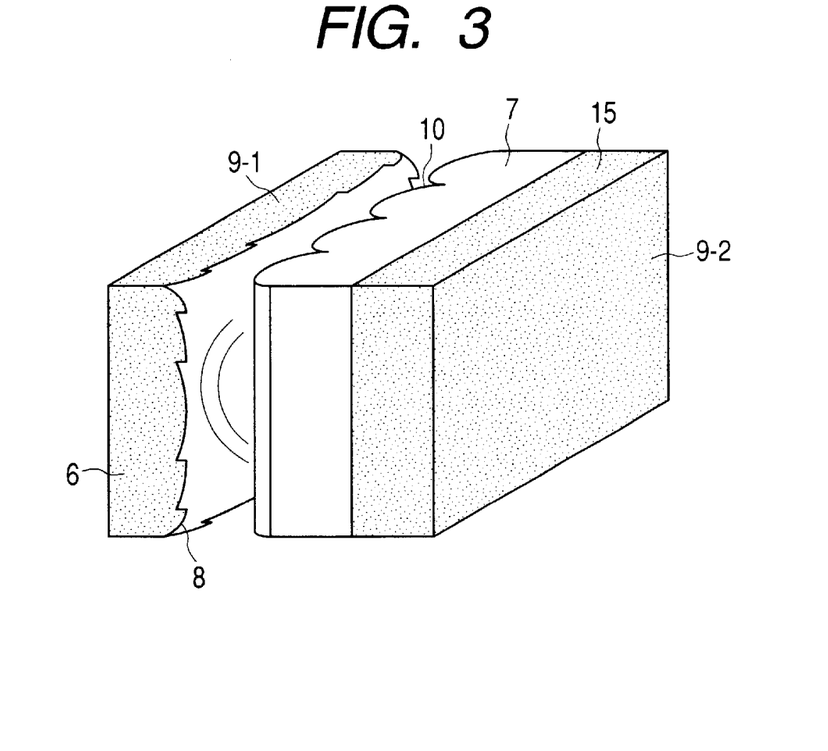
FIG. 3 is a perspective view of a first embodiment of the translucent screen, according to the present invention.

FIG. 3 is a view for showing a first embodiment of the translucent screen 4 according to the present invention. This translucent screen has a Fresnel sheet 6, being formed with the roughly concentric circle-like Fresnel lens 8 on the light exit surface thereof, and a lenticular sheet 7, being formed on the light incident surface thereof with horizontal lenticular lens 10 in semi-circular shape for diverging or radiating the light in the horizontal directions, extending in the vertical direction on the screen. The image light, being enlarged through the projection lens 2 and then reflected upon the reflection mirror 3, is incident upon a surface of the light incident side of the Fresnel sheet 6 (i.e., the left-hand side surface in the same figure) Further, a first light diffusion material 9-1 is mixed or dispersed into all over the the Fresnel sheet, and on the light exit side surface of the lenticular lens is laminated or piled up a light diffusion layer 15, into which a second light diffusion material 9-2 is mixed and/or kneaded therein. The above-mentioned first diffusion material 9-1 and the second diffusion material 9-2 may be those, being different in the quality of material (for example, in the refractive indexes thereof) from each other and/or in the particle diameter thereof, or alternatively, the both may be same in the quality of material (in the refractive index) to each other and/or in the particle diameter thereof. Also, it is possible to use two (2) kinds of the materials or more, being different from each other in the quality of materials (in the refractive index) and/or in the particle diameter thereof, for each of the first diffusion material 9-1 and the second diffusion material 9-2. As the first diffusion material 9-1 and the second diffusion material 9-2 may be used the inorganic materials, including, such as, silicon oxide, aluminum oxide, glass powder, calcium carbonate, mica, calcite, etc., or the organic materials, including, such as, acryl resin, polycarbonate resin, fluorocarbon resin, etc. Commonly, an amount of the diffusion material can be indicated by a haze value, and it can be obtained by the ratio between total light transmission factor "T" and the diffusion light transmission factor "Td", i.e., T/Td×100%.

Figure 4:
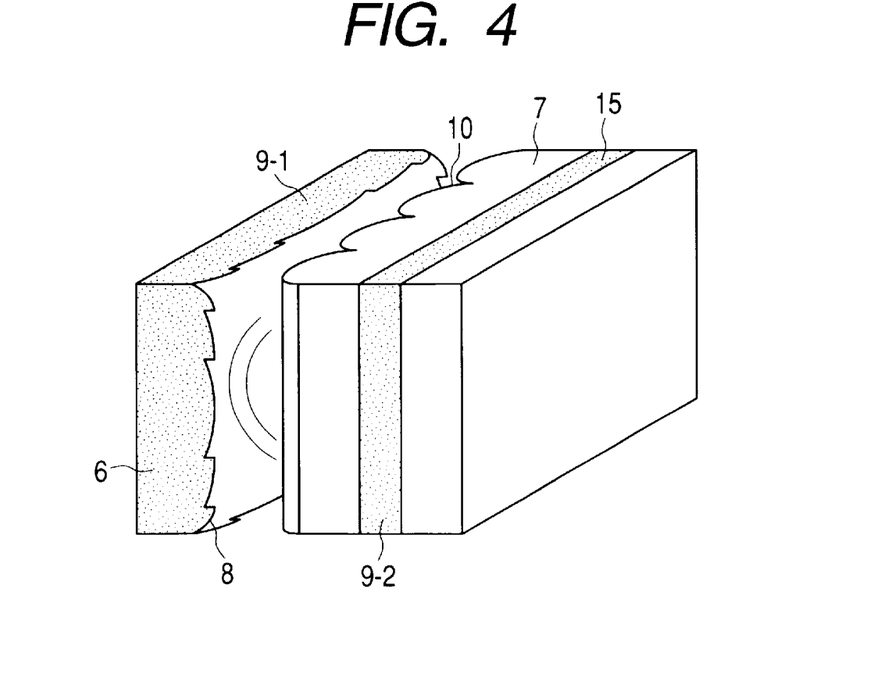
FIG. 4 is a perspective view of a second embodiment of the translucent screen, according to the present invention.

FIG. 4 is a view for showing a second embodiment of the translucent screen 4 according to the present invention. The difference of this embodiment from the embodiment shown in the FIG. 3 lies in that the lenticular sheet is divided into two (2) parts, and a light diffusion layer 15, into which the second diffusion material is mixed and kneaded, is disposed into between them in the sandwich-like manner. Other aspects than this are same to those in the first embodiment shown in the FIG. 3.

Figure 5:
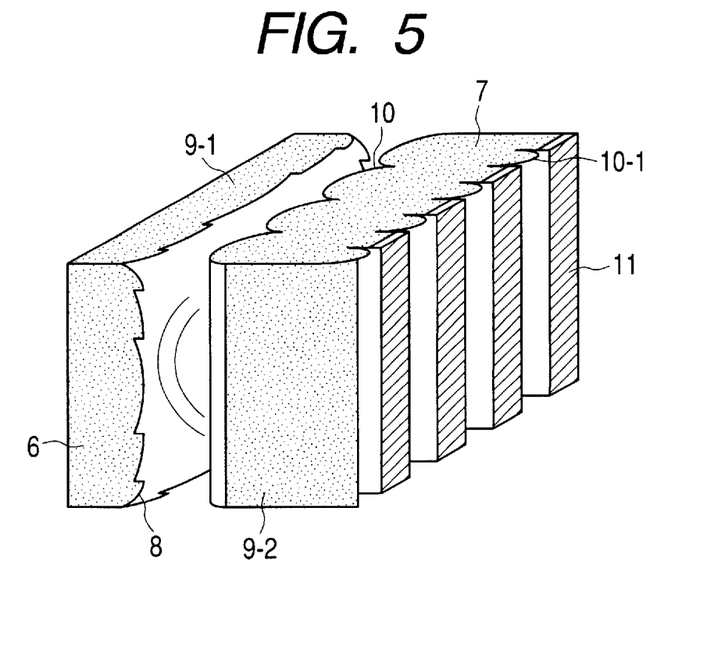
FIG. 5 is a perspective view of a third embodiment of the translucent screen, according to the present invention.

FIG. 5 is a view for showing a third embodiment of the translucent screen 4 according to the present invention. The difference of this embodiment from the embodiments shown in those FIGS. 3 and 4 lies in that, not providing the diffusion layer, into which the second diffusion material 9-2 is mixed and kneaded, on the light exit surface of the lenticular sheet 7 or in the middle portion thereof, but the second diffusion material is mixed and kneaded into the lenticular sheet 7, entirely. Furthermore, upon the light exit surface of the lenticular sheet 7 is formed other lenticular lens (i.e., an exit side lenticular lens) 10-1 at the position corresponding to the optical axis of the lenticular lens (i.e., a light incident side lenticular lens) 10 formed on the light incident side thereof, and black stripes are formed at the position corresponding to the boundaries of the light incident side lenticular lens 10 (i.e., between the light exit side lenticular lenses 10-1 of themselves), for the purpose of absorbing an exterior light mainly.

Figure 6:
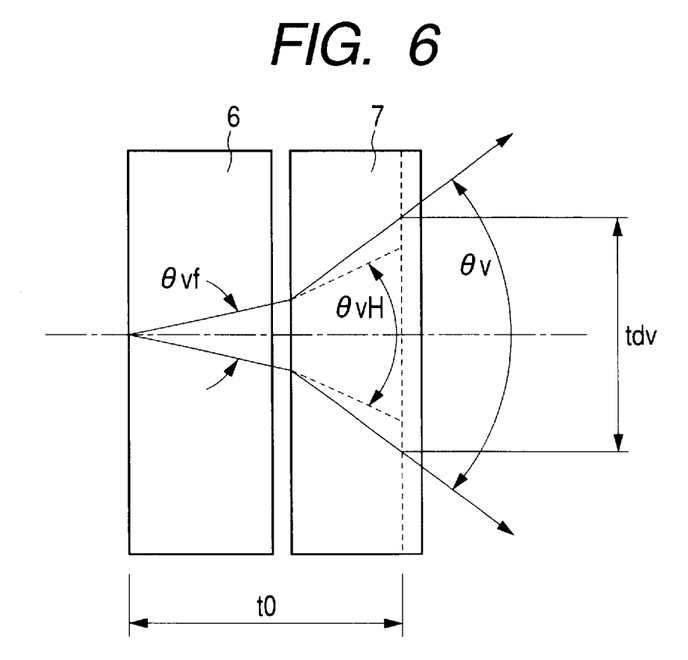
FIG. 6 is a view for showing a cross-section model of the translucent screen, according to the present invention.

Herein, explanation will be given on the structure for reducing the speckle disturbances in the translucent screen shown in any one of those FIGS. 3 to 5. First, FIG. 6 is a view for showing a model of the cross-section of the translucent screen, wherein the Fresnel lens 6 and the lenticular lens 7 are shown diagrammatically. One pixel size (Hp) on the screen is about 1 mm, and in a case of being observed from an appropriate distance therefrom, it is so considered that it can be detected for the observer's eyes as a brightness being averaged per an area of about 1 mm². Assuming that the standard difference of the averaged brightness is "σ", while the brightness of the screen "B", the following equation can be established between them:

$$\frac{\sigma}{B} \cong \frac{\lambda \cdot F \cdot M}{HP} \qquad \text{(Eq. 2)}$$

Detection limit for the speckles is set at σ/B≈0.03. However, the above equation (Eq. 2) and the detection limit σ/B≈0.03 are formulated by experiences, which are obtained by the inventors of the present invention through experiments made by them.

The level is σ/B≈0.09 (=90 μm/1 mm²) in the case explained in the conventional art, and for reducing the level down to the detection limit (σ/B≈0.03), it must be reduced down to one/third (⅓). If considering that the energy of the speckles is reserved, from the equation (Eq. 2), the speckles can be reduced by adding such a filter function of averaging the speckles through widening or expanding the area as about nine (9) times large as the interference range "D", i.e., an element for dispersing or diffusing the light therethrough. Thus, according to the present invention, the speckles are reduced in the strength or intensity per a unit area through averaging the speckle intensity, i.e., by means of enlargement of the area on the interference range "D" under the condition that the energy of the speckles is reserved.

The elements for diffusing or diverging the light, i.e., for the purpose of averaging the speckles, are the light diffusion elements 9-1 and 9-2. The diverging angle "θv" of the diverged light by means of both of those light diffusion members, as shown in FIG. 6, can be represented by a composed value between the light diverging angle "θvf" of the Fresnel sheet 6 and the light diverging angle "θvH" of the horizontal lenticular sheet 7, i.e., (θv=θvf +θvH). In the FIG. 6, "t0" indicates the distance from the incident surface of the Fresnel sheet 6 to the diffusion layer of the horizontal lenticular sheet 7, and it is equal to the distance from the light incident surface of the Fresnel sheet 6 up to the focal point of the light incident side lenticular lens 10. The definition of the former is preferably applied for in the case where the light diffusion layers 11 can be clearly divided in the lenticular sheet, as shown in the FIGS. 3 and 4. The definition of the latter can be applied for in the case where the light diffusion layers 11 can be clearly divided in the lenticular sheet, as shown in the FIGS. 3 and 4, and also in the case where the light diffusion layers cannot be clearly divided into, as shown in the FIG. 5, as well. In the structure of the FIG. 5, there is a case where the focal distance of the light incident side lenticular lens 10 is equal to the distance from the maximum height of the light incident side lenticular lens 10 to that of the light exit side lenticular lens 10-1. In this case, the "t0" can be defined to be the distance from the light incident surface of the Fresnel sheet 6 to the light exit surface of the lenticular sheet (i.e., the maximum height of the light exit side lenticular lens 10-1). Also, the "t" can be defined, t0≈ the thickness of the Fresnel sheet (≈3 mm)+the focal distance of the horizontal lenticular lens (≈0.5 mm), if omitting a space between the Fresnel sheet 6 and the lenticular sheet 7. The "θv (rad)" is the composed value of the angle "θvf", over which the light is diverged within the Fresnel sheet 6, and the angle "θvH", over which the light is diverged within the horizontal lenticular sheet 7, and thus it can be defined as an angle at which the peak brightness comes down to be a half thereof.

Assuming that the length to be averaged is "Tdv", it can be expressed by Tdv≈t0×θv, and if making at least this "Tdv" being larger than the interference range "D" (≈λ·F·M), i.e., D <Tdv, it is possible to reduce the speckles. Preferably, with respect to the area on the square having a side length of the interference range "D", the area of a square having a side length of "Tdv" is so defined, that it comes up to be as nine (9) times large or more as that. If making so, it is possible to bring the speckle intensity to be nearly equal to or less than the detection limit mentioned above, thereby to obtain an improvement on the speckle disturbances, greatly. Namely, according to the present invention, the contents of the diffusion materials in the Fresnel sheet 6 and the lenticular sheet 7, the focal distance of the lenticular lens 10, and the thickness of the Fresnel sheet are so determined, that the interference range "D" satisfies the condition, D<Tdv. The above-mentioned conditional equation can be preferably satisfied, by mainly adjusting the contents (i.e., the haze value of the each sheet, which will be mentioned later) of the respective diffusion materials contained within the Fresnel sheet 6 and the lenticular sheet 7, respectively. Also, if defining the "Tdv" to be as nine (9) times long or more as the length of the interference range "D" (thus, reducing the σ/B≈0.01), the speckle disturbances can be nearly dissolved.

Figure 7:
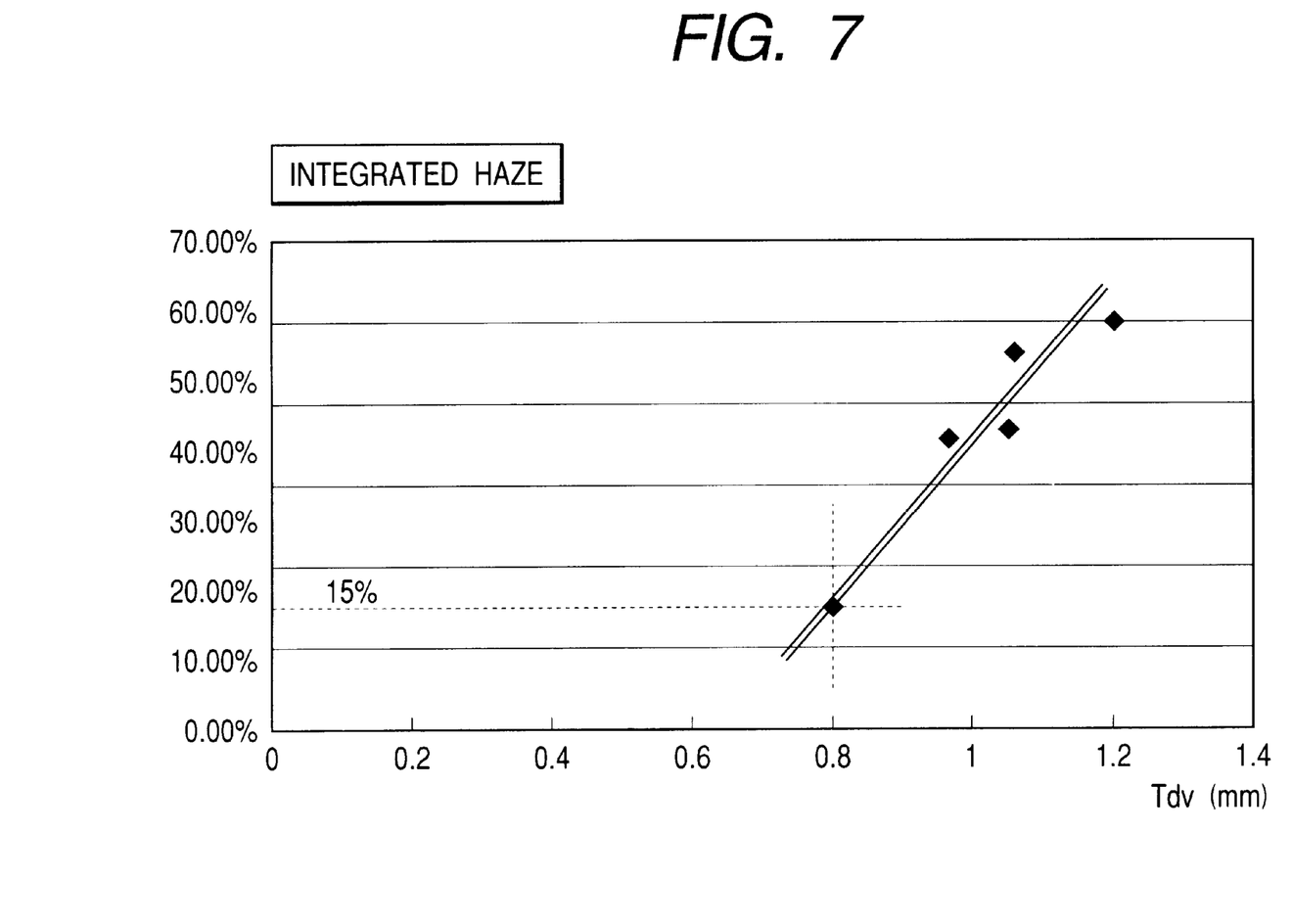
FIG. 7 is a graph for showing the relationship between measured values of integrated haze, and averaged length, i.e., Tdv.

FIG. 7 shows a relationship between the product of the haze value of the "Hf" of the Fresnel sheet 6 and the haze value "HL" of the lenticular sheet 7, i.e., an integrated haze, and the length "Tdv" to be averaged that can be obtained at that time, being obtained experimentally. However, since the diffusion materials diffuse and/or diverge the light equally all over the directional angles, then with the measure value of the "θv", it can be represented by that in the vertical direction thereof.

Now, assuming that the wavelength λ=0.5 µm, the F-value of the projection lens F=2.5, and the magnification M=70 (assuming the case where the screen size is 55 inches in the opposite angle), the interference range "D" is D≈90 µm. Accordingly, for the purpose of dissolving or remarkably reducing the speckles, as was mentioned in the above, the length "Tdv" to be averaged must be formed or determined to be at least as about nine (9) times long as the interference range "D", i.e., to be about 0.8 mm (800 µm) or more. For satisfying this condition, from the FIG. 7, it can be found that the integrated haze must be equal to 15% or more. However, if the integrated haze exceeds 45%, the light is diverged or diffused too much, and then the focus performance or property is deteriorated remarkably. Accordingly, the integrated haze is preferably equal to 45% or less than that. Namely, in the respective embodiments of the present invention, the product between the haze value "Hf" of the Fresnel sheet 6 and the haze value "HL" of the lenticular sheet 7 (i.e., the integrated haze) satisfies the following condition, 15≦Hf·HL≦45.

Further, since the Fresnel sheet 6 and the lenticular sheet 7 are disposed in that order, an image light is focused or built up by the Fresnel sheet if the amount of the diffusion material of the Fresnel sheet 6 is more than that of the lenticular sheet 7, and since that image is viewed through the horizontal lenticular sheet 7, therefore the focusing property is worsen. Accordingly, for obtaining the preferable focus property, it is desired to bring the haze value of the Fresnel sheet 6 to be smaller than the haze value of the lenticular sheet 7. Thus, in the respective embodiments of the present invention, the relationship between the haze value "Hf" of the Fresnel sheet 6 and the haze value "HL" of the lenticular sheet 7 satisfies the condition, Hf<HL.

Also, the diffusion materials are listed up or applied as the light diffusion element in the embodiments mentioned above, however the object aimed by the present invention can be accomplished even with the structure, in which the longitudinal lenticular lens is arranged in the horizontal direction, thereby constructing the so-called V-shaped lenticular lens, as far as the structure be able to maintain the dimensional relationship between the interference range "D" and the length "Tdv" to be averaged, as was described in the above.

Furthermore, though the embodiments mentioned above are in the case where the F-value=2.5 and the magnification M=70, however, it is needless to say that the object aimed by the present invention can be accomplished, even in the cases where the values of the F-number and the M are smaller than those, or alternatively in the cases where they are larger than those, as far as the structure thereof be able to maintain the dimensional relationship between the interference range "D" and the length "Tdv" to be averaged, as was described in the above.

According to the present invention, with the rear-projection display with using an image modulation element having the pixel structure, it is possible to reduce the speckle disturbances while maintaining the focus performance or property to be preferable.

What is claimed is:

1. A rear-projection type display apparatus, comprising:
an image modulation element for forming an image light through modulation of an irradiated light;
a translucent type screen; and
a projection lens for enlarging the image light formed through said image modulation element, so as to be projected upon a rear surface of said translucent type screen, wherein,
said translucent type screen comprises, a Fresnel sheet, at least on a light exit surface of which is formed a Fresnel lens, and a lenticular sheet, at least on a light incident surface of which is formed a lenticular lens for diverging the light in horizontal direction, and
each of said Fresnel sheet and said lenticular sheet contains light diffusion material therein, so as to satisfy condition as described below:

15≦Hf·HL<45

Hf<HL where, Hf (%) indicates a haze value indicative of content of the diffusion material in said Fresnel sheet, and HL (%) a haze value indicative of content of the diffusion material in said lenticular sheet.

2. A rear-projection type display apparatus, comprising:
an image modulation element for forming an image light through modulation of an irradiated light;
a translucent type screen; and
a projection lens for enlarging the image light formed through said image modulation element, so as to be projected upon a rear surface of said translucent type screen, wherein,
said translucent type screen comprises, a Fresnel sheet, at least on a light exit surface of which is formed a Fresnel lens, and a lenticular sheet, at least on a light incident surface of which is formed a lenticular lens for diverging the light in horizontal direction, and
each of said Fresnel sheet and said lenticular sheet contains light diffusion material therein, so as to satisfy condition as described below:

$t0 \cdot \theta v > \lambda \cdot F \cdot M$ where, t0 is distance from light incident sheet of said Fresnel lens to a focus of the lenticular lens formed in said lenticular sheet, θv a composed value of a light diverging angle θvf of said Fresnel sheet and a light diverging angle θvH of said lenticular sheet, F a F-number of said projection lens, M a projection magnification of said projection lens, and λ a wavelength of the light being incident upon the rear-surface of said translucent type screen.

3. A rear-projection type display apparatus, comprising:

an image modulation element for forming an image light through modulation of an irradiated light;

a translucent type screen; and a projection lens for enlarging the image light formed through said image modulation element, so as to be projected upon a rear surface of said translucent type screen, wherein, said translucent type screen comprises, a Fresnel sheet, at least on a light exit surface of which is formed a Fresnel lens, and a lenticular sheet, at least on a light incident surface of which is formed a lenticular lens for diverging the light in horizontal direction, and each of said Fresnel sheet and said lenticular sheet contains light diffusion material therein, so as to satisfy condition as described below:

$t0 \cdot \theta v > D$ where, t0 is distance from light incident sheet of said Fresnel lens to a focus of the lenticular lens formed in said lenticular sheet, θv a composed value of a light diverging angle θvf of said Fresnel sheet and a light diverging angle θvH of said lenticular sheet, D an interference range given by product between F a F-number of said projection lens, M a projection magnification of said projection lens, and λ a wavelength of the light being incident upon the rear-surface of said translucent type screen.

4. A rear-projection type display apparatus, as defined in the claim 3, wherein a relationship between said distance t0, said composed value θv of the light diverging angle, and said interference range D satisfies a following condition:

$t0 \cdot \theta v \geq 9D$.

5. A rear-projection type display apparatus, as defined in the claim 3, wherein further a following condition is satisfied:

$Hf \cdot HL \leq 45$ $Hf < HL$ where, Hf (%) indicates a haze value indicative of content of the diffusion material in said Fresnel sheet, and HL (%) a haze value indicative of content of the diffusion material in said lenticular sheet.

6. A rear-projection type display apparatus, as defined in the claim 3, wherein said image modulation element is a device for modulating the light being incident thereupon by a pixel unit, depending upon an input video signal.

7. A rear-projection type display apparatus, as defined in the claim 3, wherein said image modulation element is a device having plural numbers of micro-mirrors, for controlling reflection angles of the light being incident thereupon by a pixel unit, depending upon an input video signal.

8. A rear-projection type display apparatus, as defined in the claim 3, wherein said image modulation element is either one of reflection type and translucent type liquid crystal panels.

9. A translucent type sheet, being projected upon a rear surface thereof with a light from an image modulation element through a projection lens, comprising:

a Fresnel sheet, at least on a light exit surface of which is formed a Fresnel lens; and a lenticular sheet, at least on a light incident surface of which is formed a lenticular lens for diverging the light in horizontal direction, wherein:

each of said Fresnel sheet and said lenticular sheet contains light diffusion material therein, so as to satisfy condition as described below:

$15 \leq Hf \cdot HL \leq 45$ $Hf < HL$ where, Hf (%) indicates a haze value indicative of content of the diffusion material in said Fresnel sheet, and HL (%) a haze value indicative of content of the diffusion material in said lenticular sheet.

10. A translucent type sheet, being projected upon a rear surface thereof with a light from an image modulation element through a projection lens, comprising:

a Fresnel sheet, at least on a light exit surface of which is formed a Fresnel lens; and a lenticular sheet, at least on a light incident surface of which is formed a lenticular lens for diverging the light in horizontal direction, wherein:

each of said Fresnel sheet and said lenticular sheet contains light diffusion material therein, so as to satisfy condition as described below:

$t0 \cdot \theta v > \lambda \cdot F \cdot M$ where, t0 is distance from light incident sheet of said Fresnel lens to a focus of the lenticular lens formed in said lenticular sheet, θv a composed value of a light diverging angle θvf of said Fresnel sheet and a light diverging angle θvH of said lenticular sheet, F a F-number of said projection lens, M a projection magnification of said projection lens, and λ a wavelength of the light being incident upon the rear-surface of said translucent type screen.

11. A translucent type sheet, being projected upon a rear surface thereof with a light from an image modulation element through a projection lens, comprising:

a Fresnel sheet, at least on a light exit surface of which is formed a Fresnel lens; and a lenticular sheet, at least on a light incident surface of which is formed a lenticular lens for diverging the light in horizontal direction, wherein:

each of said Fresnel sheet and said lenticular sheet contains light diffusion material therein, so as to satisfy condition as described below:

$t0 \cdot \theta v > D$ where, t0 is distance from light incident sheet of said Fresnel lens to a focus of the lenticular lens formed in said lenticular sheet, θv a composed value of a light diverging angle θvf of said Fresnel sheet and a light diverging angle θvH of said lenticular sheet, D an interference range given by product between F a F-number of said projection lens, M a projection magnification of said projection lens, and λ a wavelength of the light being incident upon the rear-surface of said translucent type screen.

12. A translucent type sheet, as defined in the claim 11, wherein a relationship between said distance t0, said composed value θv of the light diverging angle, and said interference range D satisfies a following condition:

$$t0 \cdot \theta v > 9D.$$

13. A translucent type sheet, as defined in the claim 11, wherein further a following condition is satisfied:

$$Hf \cdot HL \leq 45$$

$$Hf < HL$$

where, Hf (%) indicates a haze value indicative of content of the diffusion material in said Fresnel sheet, and HL (%) a haze value indicative of content of the diffusion material in said lenticular sheet.

* * * * *